United States Patent [19]

Carnahan, Jr.

[11] 4,310,654
[45] Jan. 12, 1982

[54] POLYETHERSULFONEFORMALS

[75] Inventor: James C. Carnahan, Jr., Schenectady, N.Y.

[73] Assignee: General Electric Company, Schenectady, N.Y.

[21] Appl. No.: 141,252

[22] Filed: Apr. 17, 1980

[51] Int. Cl.³ .............................................. C08G 65/40
[52] U.S. Cl. ..................................... 528/174; 528/219
[58] Field of Search ................................ 528/174, 219

[56] References Cited

U.S. PATENT DOCUMENTS

| | | | |
|---|---|---|---|
| 3,069,385 | 12/1962 | Stevens | 525/470 |
| 4,110,314 | 8/1978 | Yagi et al. | 528/174 |
| 4,216,305 | 8/1980 | Carnahan | 528/196 |
| 4,260,733 | 4/1981 | Loucks et al. | 528/174 |

OTHER PUBLICATIONS

McGrath et al., *Polymer Engineering & Sci.*, vol. 17, No. 8, Aug. 1977, pp. 647-651.
Noshay et al., *J. Polymer Sci.*, Part A-1, vol. 9, 1971, pp. 3147-3159.
McGrath et al., *J. Polymer Sci., Polymer Symposium* 60, 1977, pp. 29-46.

*Primary Examiner*—Maurice J. Welsh
*Attorney, Agent, or Firm*—William A. Teoli; James C. Davis, Jr.

[57] ABSTRACT

Thermoplastic hydrolytically stable polyether sulfones having formal linkages are provided by making a polyethersulfone oligomer having terminal bisphenol linkages, and thereafter effecting reaction between the oligomer and an alkylene or bisalkylene halide. The resulting polyethersulfoneformals provide tough, transparent flexible films on solvent casting or compression molding.

10 Claims, No Drawings

POLYETHERSULFONEFORMALS

CROSS REFERENCE TO RELATED APPLICATIONS

Reference is made to my copending application Ser. No. 942,952, filed Sept. 18, 1978, now U.S. Pat. No 4,216,305, issued May 8, 1980 for Aromatic Polyformal Carbonates and Method for Making and copending application Ser. No. 958,040, filed Nov. 6, 1978 for Method for Making Polyformals and Polyformal Products Made Thereby for Allan S. Hay, where both applications are assigned to the same assignee as the present invention.

BACKGROUND OF THE INVENTION

The present invention relates to polyethersulfoneformals and a method for making.

Prior to the present invention, aromatic polyformals were made by forming a diphenylate preform and reacting it in the presence of an alkylene halide, such as methylene halide, in an organic solvent, as shown by Barclay, U.S. Pat. No. 3,069,386. The resulting polyformal could thereafter be phosgenated to produce an aromatic polyformal convertible to fibers and films. The resulting formal oligomer prior to phosgenation was a random block polyformal which required additional polymerization to produce a higher molecular weight material capable of being fabricated as previously indicated. In addition, the polyformal carbonates made in accordance with Barclay are hydrolytically unstable materials because of the carbonate linkages and have a relatively low glass transition temperature, for example, between 80 to 160. Improved results were achieved by effecting reaction between the alkylene halide and the dihydric phenol under insitu conditions in the presence of a phase transfer catalyst as shown by copending application of Allan S. Hay previously cited. The aromatic polyformals made in accordance with the aforementioned Hay method were formed having substantially higher intrinsic viscosities resulting in significantly improved physical properties, such as Gardner Impact values, as compared to the Aromatic polyformals of Barclay.

The present invention is based on the discovery that aromatic polyformals can be made having polyethersulfone oligomer units by initially forming a polyethersulfone oligomer having terminal phenoxide linkages as defined hereinafter, which can be reacted with an alkylene halide in the presence of an organic solvent, such as dipolar aprotic solvent. It also has been found that a nonpolar solvent can be employed in instances where a phase transfer catalyst is utilized in accordance with a procedure originally discovered by Hay in Ser. No. 958,040.

STATEMENT OF THE INVENTION

There is provided by the present invention a method for making polyethersulfone formals which comprises
(A) effecting reaction between a dihalodiarylsulfone of the formula, $$XRSRX, \quad (1)$$

(where the S is shown as $\overset{O}{\underset{O}{\overset{\|}{S}}}$)

and sufficient bisphenoxide salt of the formula, $$MOZOM, \quad (2)$$

in the presence of a dipolar aprotic solvent to produce a bisphenoxide terminated diarylsulfone bisphenol oligomer,
(B) effecting reaction between the oligomer of (A) and an alkylene halide of the formula, $$XR^1X, \quad (3)$$

to produce a polyethersulfoneformal and
(C) recovering the resulting polyethersulfonformal from the mixture of (B), where R is a divalent $C_{(6-13)}$ aromatic radical, $R^1$ is a member selected from divalent $C_{(1-8)}$ alkylene radicals and haloalkylene radicals and a

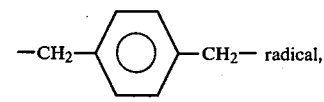 radical,

Z is a divalent $C_{(6-25)}$ aromatic radical, M is an alkali metal ion and X is a halogen radical.

In a further aspect of the present invention there is provided polyethersulfoneformal consisting essentially of chemically combined units having the formula,

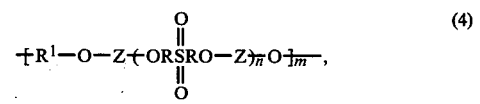

where m is an integer greater than 1 and n is an integer equal to 1 to 400 inclusive, and R, $R^1$ and Z are as previously defined.

Radicals included within R, are, for example, phenyl, tolyl, naphthyl, etc. Radicals included within Z are, for example, divalent aromatic radicals, for example, phenylene, tolyene, xylylene, naphthalene, etc.; halogenated derivatives of such divalent aromatic hydrocarbon radicals, such as chlorophenylene, bromotolyene, etc., divalent radicals, such as $-R^2QR^2$, where $R^2$ is selected from $C_{(6-13)}$ divalent aromatic radicals, Q can be cyclohexyl, fluorenyl,

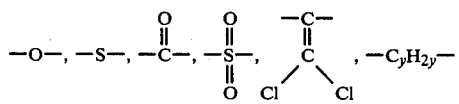

and y is equal to 1 to 5 inclusive.

There are included by $R^1$, radicals such as $CH_2$, $-CF_2-$, $-CH_2CH_2-$, etc.

Some of the dihalodiarylsulfones included within formula (1) are, for example,

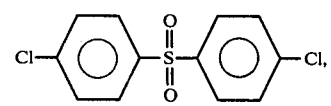

-continued

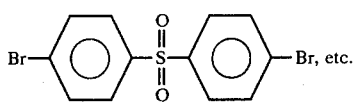

Among the bisphenols which can be used to make the bisphenoxide salts of formula (2) are, for example,
2,2-bis(4-hydroxyphenyl)propane (Bisphenol-A);
2,2-bis(4-hydroxy-2,6-dimethylphenyl)propane;
2,4'-dihydroxydiphenylmethane;
bis-(4-hydroxyphenyl)methane;
1,1-bis-(4-hydroxyphenyl)ethane;
1,1-bis-(4-hydroxyphenyl)propane;
2,2-bis-(4-hydroxyphenyl)pentane;
3,3-bis-(4-hydroxyphenyl)pentane;
4,4'-dihydroxybiphenyl;
2(4-hydroxyphenyl)-2'-(3-hydroxyphenyl)propane;
4,4'-dihydroxy-3,3', 5,5'-tetramethylbiphenyl;
2,4'-dihydroxybenzophenone;
4,4'-dihydroxydiphenylsulfone;
2,4'-dihydroxydiphenylsulfone;
4,4'-dihydroxydiphenylsulfide;
hydroquinone;
resorcinol;
9,9'-bis(4-hydroxyphenyl)-fluorene
3,4'-dihydroxydiphenylmethane;
4,4'-dihydroxybenzophenone;
4,4'-dihydroxydiphenylether;
2,2'-bis(4-hydroxyphenyl)-1,1-dichloroethylene;
2,2-bis(4-hydroxy-3-methylphenyl)propane;
2,2-bis(4-hydroxy-3,5-dimethylphenyl)propane;
1,1-bis(4-hydroxyphenyl)cyclohexane;
1,1-bis(4-hydroxy-3,5-dimethylphenyl)cyclohexane;
1,1-bis(4-hydroxy-3-methylphenyl)cyclohexane;
bis(4-hydroxy-3,5-dimethylphenyl)sulfone;
5-chloro-2,4'-dihydroxydiphenylsulfone;
4,4'-dihydroxydiphenyl ether;
4,4'-dihydroxy-2,5'-dimethyldiphenyl ether, etc.

Included by the alkylene halide of formula (3) are, for example, $CH_2Cl_2$, $CH_2Br_2$, $CF_2Br_2$, $CH_2CLBr$, etc.

The polyethersulfoneformals of formula (4) are high performance thermoplastics having superior resistance to UV degradation. The polyethersulfoneformals have excellent hydrolytic stability and a wide range of Tg's, for example, 100° C. to 190° C. Preferably, the product of n x m of formula (4) is 20 to 250. These materials can be injection molded and blended with a wide variety of other polymers and fillers to produce a wide spectrum of high performance thermoplastics. For example, blending can be effected with organic resins, such as Lexan ® resin, PPO ® resin, Valox ® resin, all products of the General Electric Company, over wide propertions by weight, such as from 1% to 99% of the polyformal resin to 99% to 1% of the high performance thermoplastic organic resin. The polyformal resins of the present invention also can be blended with various fillers, such as glass fiber, silicon carbide whiskers, silica fillers, etc., stabilizers, pigments, flame retardants, etc. The polyethersulfoneformals of formula (4) can be used as solar panel covers, automotive parts, containers, etc.

In the practice of the present invention, the polyethersulfoneformals can be made by initially making an oligomer utilizing an alkali metal hydroxide and a dipolar aprotic solvent which thereafter is reacted with the alkylene halide. Alternatively, polyethersulfoneformals can be made by the "in situ" procedure utilizing a phase transfer catalyst in a nonpolar organic solvent.

In instances where a dipolar aprotic solvent is employed, a bisphenoxide salt of formula (2) is prepared by effecting reaction between a stoichiometric amount of a dihydric phenol and an alkali metal hydroxide in the presence of an inert solvent under substantially anhydrous conditions. Suitable solvents which can be utilized are, for example, benzene, toluene, linear and branched alkanes, chloro benzene, dichlorobenzene, etc. The bisphenoxide salt can be prepared by heating the aforementioned mixture of ingredients at a temperature in the range of from 80° C. to 200° C. under an inert gas atmosphere until water is removed leaving substantially anhydrous bisphenoxide salt. The procedure of Takekoshi also can be used to make the bisphenoxide salt of formula (2) as shown in copending application Ser. No. 37,440, filed May 9, 1979 now U.S. Pat. No. 4,202,993, for Method for Making Substantially Anhydrous Alkali Metal Bisphenol Salts.

Reaction can be effected between the bisphenoxide salt and the dihalodiarylsulfone utilizing a sufficient stoichiometric excess of the bisphenoxide salt to provide for terminal bisphenoxide linkages in the resulting oligomer. Preferably, a mole ratio of from 1.0001 to 2 of bisphenoxide per mole of dihalodiarylsulfone can be used. It has been found that if the ratio of bisphenoxide salt exceeds 2 moles, per mole dihalodiarylsulfone, the resulting polymer can contain polyformal blocks. By control of the ratio of the bisphenoxide salt to the dihalodiarylsulfone, a wide range of oligomers can be prepared. The resulting mixture which contains dipolar aprotic solvent is heated at a temperature in the range of about 80° C. to 180° C. with stirring to effect the interaction between the bisphenoxide and the dihalodiarylsulfone.

There can then be added to the mixture, a solution of a chain-stopper, such as phenol, in an organic solvent and the mixture is then heated with stirring to a temperature from about ambient to 150° C. The alkylene halide can be used in excess amounts while the chain stopper proportions will vary in accordance with the MW desired.

The in situ procedure for making the polyethersulfone-formal, based on the use of a phase transfer catalyst and a nonpolar organic solvent can be carried out by suspending a mixture of the bisphenoxide salt and the dihalodiarylsulfone in a nonpolar organic solvent in the presence of a phase transfer catalyst. The proportions of the bisphenoxide salt and dihalodiarylsulfone are as shown above, while the phase transfer catalyst, for example, quaternary ammonium and phosphonium salts as described in JACS 93 195 (1971) by C. M. Starks can be used at from 0.01 to 0.5 mole, per mole of the bisphenol salt and preferably 0.02 to 0.10 mole. Suitable nonpolar solvents which can be used are, for example, toluene, dichlorobenzene, etc., at temperatures of from about 80° C. to 180° C. Incorporation of the chain-stopper, such as phenol, dissolved in an appropriate organic solvent including the alkylene halide can be effected as described above.

In order that those skilled in the art will be better able to practice the invention, the following examples are given by way of illustration and not by way of limitation. All parts are by weight.

EXAMPLE 1

A mixture of 10.27 parts of 2,2-bis-(4-hydroxyphenyl) propane, or "bisphenol-A", 25 parts of dimethylsulfoxide and 110.6 parts chlorobenzene was heated to 70° C. There was then added to the mixture 7.5 parts of a 50% aqueous solution of sodium hydroxide and the resulting white suspension was heated to reflux under a Dean-Stark trap until water ceased to appear in the distillate. Excess chlorobenzene was then distilled from the mixture resulting in the production of a viscous oil at 155° C. There was then added 6.46 parts of 4,4'-dichlorodiphenylsulfone in 38 parts of dimethylsulfoxide over a 10 minute period. The resulting mixture which was a deep green color was then stirred at 160° C. for 45 minutes, then cooled to 100° C. There was added to the resulting mixture 22 parts of chlorobenzene containing 15 parts of methylene chloride. The green color of the mixture immediately disappeared and the viscosity of the mixture rose rapidly. There was then added to the mixture 0.05 part of phenol in about 5.5 parts of chlorobenzene and the reaction mixture was allowed to cool to room temperature. Additional chlorobenzene was added and the reaction mixture was filtered and precipitated into methanol. There was obtained a stringy solid which was washed, air dried, and dissolved in methylene chloride, filtered and reprecipitated. There was obtained 8.1 parts of a dry powder after it was dried in a vacuum oven, which represented a 53% yield. Based on method of preparation, the product was a polyethersulfone having the following formula,

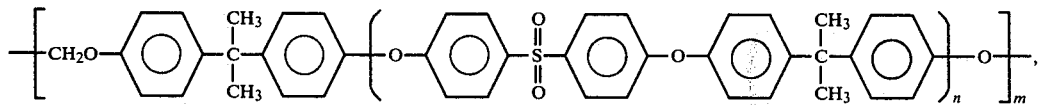

where $n \cong 1$ and $m = 180$ and the end groups are of the form

Biphenol (Biphenol), to 4,4'-dichlorodiphenylsulfone (DCDPS) was varied. The results shown in the following table, where $T_g$ indicates glass transition temperature, I.V. indicates intrinsic viscosity and $M_w$ indicates the weight average of the polymer, $M_n$ indicates the number average of the polymer:

| Bisphenol moles | DCDPS moles | Mole Ratio | Chain Stop | $T_g$ °C. | I.V. | $M_w$ | $M_n$ | $M_w/M_n$ |
|---|---|---|---|---|---|---|---|---|
| BPA (.0451) | .0225 | 2.0 | a | 149 | .911 | 122000 | 21700 | 5.62 |
| BPA (.0901) | .0451 | 1.99 | a | — | — | 24900 | 7000 | 3.54 |
| BPA (.0451) | .03375 | 1.34 | a | 171.5 | .453 | 64300 | 10100 | 5.49 |
| BPA (.0451) | .0225 | 2.00 | a | 147.5 | .429 | 52400 | 11700 | 5.49 |
| biphenol (.0452) | .0225 | 2.01 | — | 192 | .578 | 57800 | 16200 | 5.15 | a $5 \times 10^{-4}$ mole phenol; 1.2 mole %

EXAMPLE 2

A mixture of 2.020 parts of bisphenol-A, 1.407 part of 50.3% aqueous sodium hydroxide solution and 1.93 part of water was briefly heated to a boil. The resulting fluid slurry of the bisphenol-A disodium salt was spread over a nickle coated brass sheet on a hot plate which was inside of a dry box and which was preheated at 300° to 320° C. Evaporation of the water was instantaneous, resulting in a white powdery solid. Based on method of preparation, the powdery solid was the disodium salt of bisphenol-A. After a total heating time of 60 seconds, the bisphenol-A salt was collected. Proton NMR spectrum in D$_2$O solution indicated that the product was free of decomposition product. In addition, the IR spectrum of the bisphenol-A salt indicated that the product was completely anhydrous.

A mixture consisting of 272 parts of the above Bisphenol-A disodium salt and 191 parts of dichlorodiphenyl sulfone is suspended in 1000 parts chlorobenzene. There is added 32 tetrabutylammonium bromide. The mixture is stirred viborously under nitrogen at 125° C. for 1 hour. The mixture is cooled to 35° C., 2 parts sodium phenoxide is added, then 20 parts dichloromethane in 100 parts chlorobenzene. The mixture is heated to 100° C. for 15 minutes. A product is isolated by filtering the above suspension and adding the filtrate to a large excess of methanol. The precipitated product is collected and dried in vacuo. Based on method of preparation, the product is a polyethersulfoneformal having the formula,

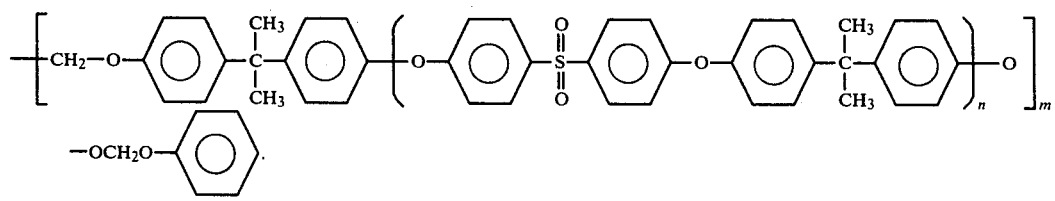

where $n = 3$ and $m > 75$.

A film is cast from the above polyethersulfone utilizing methylene chloride as the solvent. The resulting film is tough, transparent and flexible.

The above procedure was repeated, except that the ratio of Bisphenol which was either BPA, or, 4,4-

Although the above examples are directed to only a few of the very many variables which can be used in the practice of the present invention, it should be understood that the present invention is directed to a much broader variety of polyethersulfoneformals and the use of a much broader variety of dihydric phenols, dihalodiarysulfones and alkylene halides utilized in the production of such polyethersulfoneformals.

What I claim as new and desire to secure by Letters Patent of the United States is:

1. A method for making polyethersulfoneformals which comprises,
   (A) effecting reaction between a dihalodiarylsulfone of the formula, $$XRSRX,$$
with O above and O below the middle S (i.e. $XR\overset{O}{\underset{O}{S}}RX$)

and from 1.0001 to 2 moles, per mole of the dihalodiarylsulfonium of a bisphenoxide salt of the formula,

MOZOM, in the presence of a dipolar aprotic solvent, or a nonpolar solvent and an effective amount of a phase transfer catalyst to produce a bisphenoxide terminated diarylsulfone bisphenol oligomer,
   (B) effecting reaction between the oligomer of (A) and an methylene halide selected from the class consisting of $XCH_2X$ and $XCF_2X$ to produce a polyethersulfoneformal and
   (C) recovering the resulting polyethersulfoneformal from the mixture of (B), where R is a divalent $C_{(6-13)}$ aromatic radical, Z is a divalent $C_{(6-25)}$ aromatic radical, M is an alkali metal ion and X is halogen.

2. A metod in accordance with claim 1, where the bisphenoxide salt is the disodium salt of bisphenol-A.

3. A method in accordance with claim 1, where the dihalodiarylsulfone is 4,4'-dichlorodiphenylsulfone.

4. A method in accordance with claim 1, where the phase transfer catalyst is tetra n-butylammonium bromide.

5. A method in accordance with claim 1, where the alkylene halide is methylene chloride.

6. A method in accordance with claim 1, where phenol is used as a chain stopper.

7. Polyethersulfoneformals consisting essentially of chemically combined units of the formula, $$\{R^1-O-Z+OR\overset{O}{\underset{O}{S}}RO-Z\}_n O\}_m , \quad (4)$$

where R is a divalent $C_{(6-13)}$ aromatic radical, $R^1$ is a member selected from divalent $C_{(1-8)}$ alkylene radicals and haloalkylene radicals and a $$-CH_2-\underset{}{\bigcirc}-CH_2-$$

radical, Z is a divalent $C_{(6-25)}$ aromatic radical, m is an integer greater than 1 and n is an integer equal to 1 to 400 inclusive.

8. A polyethersulfoneformal of claim 7, where R is $$-\underset{}{\bigcirc}-$$

9. A polyethersulfoneformal of claim 7, where Z is $$-\underset{}{\bigcirc}-\underset{CH_3}{\overset{CH_3}{C}}-\underset{}{\bigcirc}-$$

10. A polyethersulfoneformal of claim 7, where $R^1$ is $-CH_2-$.

* * * * *